US009959548B2

(12) United States Patent
Huddleston et al.

(10) Patent No.: US 9,959,548 B2
(45) Date of Patent: May 1, 2018

(54) METHOD AND SYSTEM FOR GENERATING SOCIAL SIGNAL VOCABULARIES

(71) Applicant: Sprinklr Inc., New York, NY (US)

(72) Inventors: Erik Lee Huddleston, Austin, TX (US); Brian Huddleston, Austin, TX (US); Tim Potter, Austin, TX (US)

(73) Assignee: SPRINKLR, INC., New York, NY (US)

( * ) Notice: Subject to any disclaimer, the term of this patent is extended or adjusted under 35 U.S.C. 154(b) by 98 days.

(21) Appl. No.: 14/336,914

(22) Filed: Jul. 21, 2014

(65) Prior Publication Data
US 2014/0330632 A1    Nov. 6, 2014

Related U.S. Application Data

(63) Continuation-in-part of application No. 13/727,991, filed on Dec. 27, 2012, which is a continuation-in-part of application No. 13/708,020, filed on Dec. 7, 2012, which is a continuation-in-part of application No. 13/682,449, filed on Nov. 20, 2012, which is a continuation-in-part of application No. 13/601,151, filed on Aug. 31, 2012, now Pat. No. 9,251,530.

(60) Provisional application No. 61/857,527, filed on Jul. 23, 2013.

(51) Int. Cl.
*G06Q 30/02*    (2012.01)
*G06Q 50/00*    (2012.01)

(52) U.S. Cl.
CPC ......... *G06Q 30/0242* (2013.01); *G06Q 50/01* (2013.01)

(58) Field of Classification Search
CPC ............... G06Q 30/0242; G06Q 50/01; G06F 17/30545; H04M 2203/4509; H04M 3/53
USPC .................................................. 709/206–245
See application file for complete search history.

(56) References Cited

U.S. PATENT DOCUMENTS

| 5,729,637 | A  |   | 3/1998  | Nicholson et al. |
| 7,328,242 | B1 |   | 2/2008  | McCarthy et al. |
| 7,899,871 | B1 |   | 3/2011  | Kumar et al. |
| 8,291,016 | B1 | * | 10/2012 | Whitney ............ G06Q 30/0201 709/204 |
| 8,364,467 | B1 |   | 1/2013  | Bowman |

(Continued)

OTHER PUBLICATIONS

Mahout, "Creating Vectors from Text", https://cwiki.apache.confluence/display/MAHOUT/Creating+Vectors+from+Text (2014); 6 pages.

(Continued)

*Primary Examiner* — David Lazaro
*Assistant Examiner* — Berhanu Shitayewoldetadik
(74) *Attorney, Agent, or Firm* — Schwabe Williamson & Wyatt, PC

(57) ABSTRACT

A social analytic system may identify the social signals associated with a brand, campaign, or any other topic. The social analytic system may generate a vocabulary associated with the brand, campaign, or topic based terms used in the associated social signals. The vocabulary may be used for generating social media analytics and identifying social media events, such as marketing campaigns. In one example, a vocabulary may be compared with vocabularies associated with different constituents to identify the positive and negative terms in the vocabulary.

24 Claims, 11 Drawing Sheets

(56) References Cited

U.S. PATENT DOCUMENTS

| | | | |
|---|---|---|---|
| 8,583,747 B2 | 11/2013 | Buchheit et al. | |
| 8,606,792 B1 | 12/2013 | Jackson | |
| 8,620,718 B2 | 12/2013 | Varghese | |
| 9,081,777 B1* | 7/2015 | Krawczyk | G06F 17/3002 |
| 2002/0059220 A1* | 5/2002 | Little | G06F 17/30616 |
| 2009/0018996 A1 | 1/2009 | Hunt | |
| 2009/0192874 A1* | 7/2009 | Powles | G06Q 30/02 |
| | | | 705/14.58 |
| 2009/0281870 A1 | 11/2009 | Sun et al. | |
| 2009/0327972 A1 | 12/2009 | McCann et al. | |
| 2010/0049504 A1* | 2/2010 | Rajan | G06F 17/30713 |
| | | | 704/10 |
| 2010/0064017 A1 | 3/2010 | Buchheit et al. | |
| 2010/0119053 A1 | 5/2010 | Goeldi | |
| 2010/0121707 A1* | 5/2010 | Goeldi | G06Q 10/00 |
| | | | 705/14.49 |
| 2010/0268597 A1* | 10/2010 | Bookstaff | G06F 17/30864 |
| | | | 705/14.49 |
| 2010/0306043 A1* | 12/2010 | Lindsay | G06Q 30/02 |
| | | | 705/14.41 |
| 2011/0119125 A1* | 5/2011 | Javangula | G06Q 30/02 |
| | | | 705/14.43 |
| 2011/0145064 A1 | 6/2011 | Anderson | |
| 2011/0213670 A1 | 9/2011 | Strutton | |
| 2011/0231240 A1 | 9/2011 | Schoen | |
| 2011/0282733 A1* | 11/2011 | Gnanasambandam | G06Q 30/02 |
| | | | 705/14.44 |
| 2011/0282943 A1 | 11/2011 | Anderson | |
| 2012/0004959 A1* | 1/2012 | Benyamin | G06Q 30/0241 |
| | | | 705/14.4 |
| 2012/0004983 A1* | 1/2012 | Borthwick | G06Q 30/02 |
| | | | 705/14.45 |
| 2012/0005106 A1* | 1/2012 | Famous | G06Q 10/06 |
| | | | 705/304 |
| 2012/0117059 A1 | 5/2012 | Bailey | |
| 2012/0123924 A1 | 5/2012 | Rose | |
| 2012/0143700 A1 | 6/2012 | Bhattacharya | |
| 2012/0185544 A1 | 7/2012 | Chang | |
| 2012/0239761 A1 | 9/2012 | Linner et al. | |
| 2012/0278329 A1 | 11/2012 | Borggaard et al. | |
| 2012/0290446 A1 | 11/2012 | England | |
| 2013/0014136 A1 | 1/2013 | Bhatia | |
| 2013/0018893 A1 | 1/2013 | Nelson | |
| 2013/0018968 A1 | 1/2013 | Pennacchiotti | |
| 2013/0073387 A1 | 3/2013 | Heath | |
| 2013/0073389 A1 | 3/2013 | Heath | |
| 2013/0073400 A1 | 3/2013 | Heath | |
| 2013/0073473 A1 | 3/2013 | Heath | |
| 2013/0132437 A1 | 5/2013 | Park et al. | |
| 2013/0204823 A1 | 8/2013 | Treiser | |
| 2013/0226820 A1* | 8/2013 | Sedota, Jr. | G06Q 30/0201 |
| | | | 705/319 |
| 2013/0273976 A1 | 10/2013 | Rao et al. | |
| 2013/0275352 A1 | 10/2013 | Servi et al. | |
| 2013/0304726 A1 | 11/2013 | Sandulescu et al. | |
| 2013/0304819 A1 | 11/2013 | Oane et al. | |
| 2013/0339021 A1 | 12/2013 | Deshmukh | |
| 2014/0108562 A1 | 4/2014 | Panzer | |
| 2014/0330632 A1 | 11/2014 | Huddleston | |

OTHER PUBLICATIONS

Mei, et al., Automatic Labeling of Multinomial Topic Models; Dept of Computer Science, University of Illinois at Urbana-Champaigh, Urbana, IL 61801; 2007; 10 pages.

Salton, et al., A Vector Space Model for Automatic Indexing; Information Retrieval and Language Processing; Communications of the ACM; vol. 18, No. 11; Nov. 1975; pp. 613-620.

Vinciarelli, Alessandro, et al.; Image and Vision Computing "Social signal processing: Survey of an emerging domain"; journal homepage: www.elsevier.com/locate.imavis; Sep. 26, 2008; pp. 1743-1759 (17 pages).

Dachis, et al., Social Business Design; Business Journal; Oct. 5, 2009; pp. 1-16.

United States Patent and Trademark Office; International Search Report and Witten Opinion PCT/US2014/047653; dated Jun. 22, 2015; 8 Pages.

\* cited by examiner

METHOD AND SYSTEM FOR GENERATING SOCIAL SIGNAL VOCABULARIES

The present application claims priority to U.S. Provisional Patent Ser. No. 61/857,527, entitled: METHOD AND SYSTEM FOR GENERATING SOCIAL SIGNAL VOCABULARIES, filed Jul. 23, 2013, also a continuation-in-part of U.S. patent application Ser. No. 13/727,991, entitled: METHOD AND SYSTEM FOR CORRELATING SOCIAL MEDIA CONVERSATIONS, filed Dec. 27, 2012; which is a continuation-in-part of U.S. patent application Ser. No. 13/708,020, entitled: METHOD AND SYSTEM FOR TEMPORAL CORRELATION OF SOCIAL SIGNALS, filed Dec. 7, 2012; which is a continuation-in-part of U.S. patent application Ser. No. 13/682,449, entitled: APPARATUS AND METHOD FOR IDENTIFYING CONSTITUENTS IN A SOCIAL NETWORK, filed Nov. 20, 2012; which is a continuation-in-part of U.S. patent application Ser. No. 13/601,151, entitled: APPARATUS AND METHOD FOR MODEL-BASED SOCIAL ANALYTICS, filed Aug. 31, 2012 which are all herein incorporated by reference in their entirety.

BACKGROUND

Social networks are used by businesses to advertise and market products. For example, a company may use a social network to announce the launch of a new product. Consumers then write blogs, send messages, etc. discussing and reviewing the new product. The product launch may be considered a success or a failure based on the social network interactions surrounding the new product. For example, the product launch may be considered a success when a large number of consumers generate a large number of positive social network reviews about the new product. The product launch may be considered a failure when there is little "buzz" surrounding the launch and only a small number of consumers generate a relatively small number of social network reviews. The product launch also could be considered a failure when a large number of negative reviews are generated about the new product.

Companies face a challenge monitoring and managing social network interactions regarding their products. For example, a large company may have millions of followers on their social networks that send or post millions of messages related to different products. Companies may not have the human resources to manually monitor and manage such large amounts of social network traffic.

Even if companies had the human resources to monitor related social network traffic, it would still be difficult to quantitatively measure the performance of social network marketing campaigns. For example, the marketing campaign may not necessarily be directed to increasing the sales of a specific product, but may be directed to increasing general product awareness. Reviewing a small window of subjective consumer comments sent over social networks may not provide the quantitative analytics needed to clearly determine the success of the product awareness marketing campaign.

DETAILED DESCRIPTION

Companies may want to determine the effectiveness of marketing campaigns. For example, a company may launch a social media campaign for a new soft drink. The company may want to track the overall successes of the soft drink campaign, the social media activity initiated by the campaign, overall public impression of the campaign, specific impressions of the campaign by different social groups, the relative success of the campaign compared with campaigns for similar brands within the same company, and/or the relative success of the campaign compared with the campaigns of other companies, etc. Companies also may want to be notified when other companies launch campaigns for similar products or bands.

Figure 1:
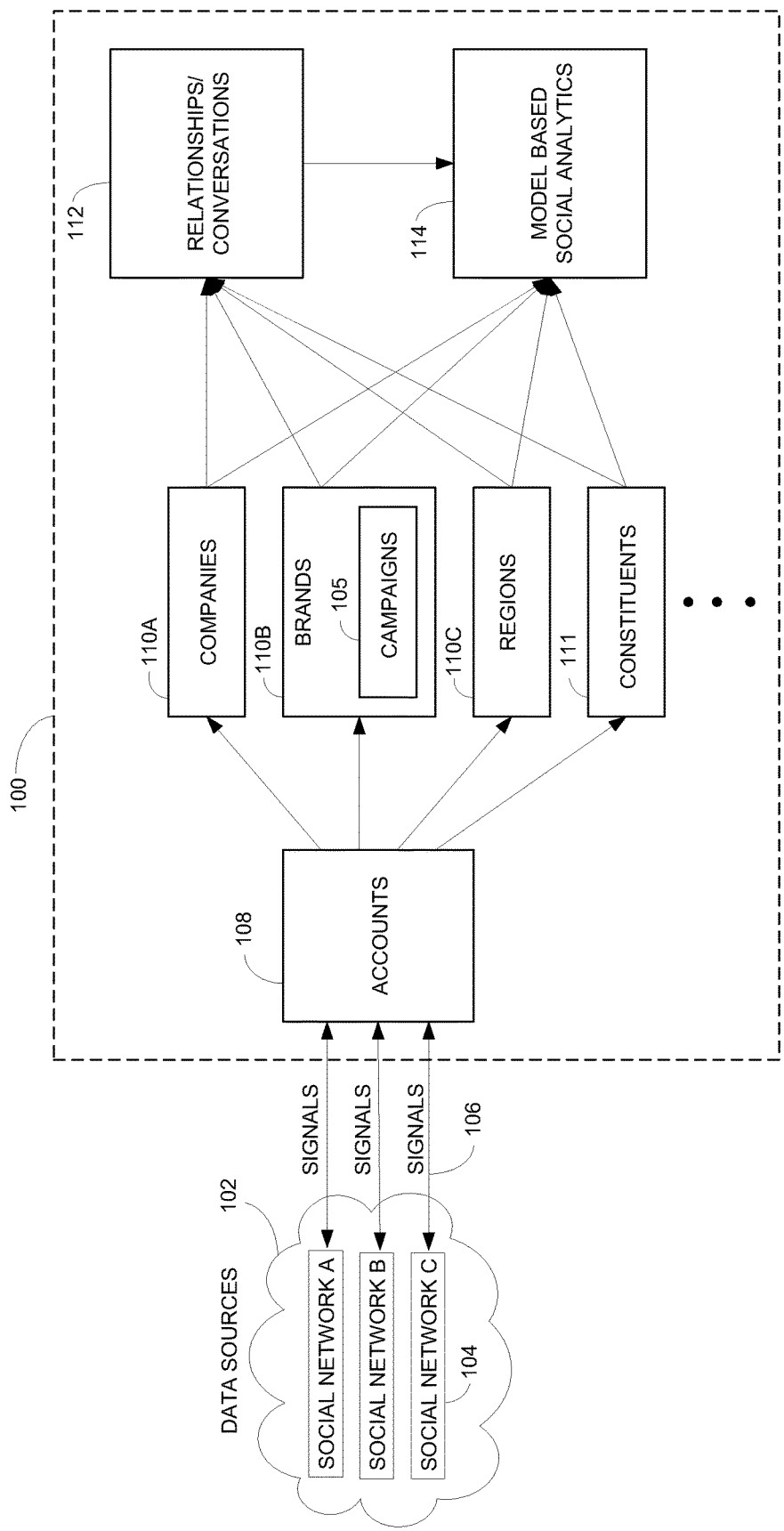
FIG. 1 depicts an example of a social analytic system.

FIG. 1 depicts an example of a model based social analytic system 100 configured to generate quantitative campaign metrics for social media. In one example, data sources 102 may comprise one or more social networks 104, such as Twitter®, Facebook®, YouTube®, Google+®, or the like, or any combination thereof including pre-existing services that aggregate social sources (such as BoardReader®). However, data sources 102 may comprise any computing system or social network that generates or aggregates messages that may be exchanged or reviewed by different users.

Accounts 108 are stored within analytic system 100 and identify corresponding social network accounts within the social networks 104. In one example, analytic system 100 may attempt to identify substantially all of the social network accounts for substantially every major company for a variety of different industries. Accounts 108 also may contain substantially all of the social network accounts for substantially all of the products marketed by each of the companies.

Any combination of computing devices, such as network servers and databases may operate within analytic system 100 and collect signals 106 from Application Programmer Interfaces (APIs) or other collection schemes, including collecting signals 106 from third parties. Signals 106 may contain content and/or metadata for messages sent or posted by the associated network accounts. For example, signals 106 may include the content of a message, the user account information for the social network sending the message, tags identifying the context of the message, a Universal Resource Locator (URL) for the message, a message type identifier, etc.

For explanation purposes, messages may refer to any communications exchanged via a social network 104 and any content or information that may be associated with the communication. For example, messages may comprise posts, blogs, Tweets, re-tweets, sentiment indicators, emails, text messages, videos, wall posts, comments, photos, links, or the like, or any combination thereof.

Accounts 108 and signals 106 may be associated with contextual dimensions, such as companies 110A, brands 110B, geographic regions 110C, etc. The accounts 108 and signals 106 also may be associated with different types of constituents 111, such as advocates, influencers, partners, detractors, employees, spammers, or market participants. Values of contextual dimensions 110 may be identified a priori or may be determined from the message content or metadata in signals 106. For example, Universal Resource Locators (URLs) or hash tags within signals 106 may identify a particular brand 110B. In another example, the message content in signals 106 may include keywords that refer to particular brands 110B.

In yet another example, some of the signals 106 associated with brands 110B may also be associated with different brand campaigns 105. For example, a company may create a marketing campaign 105 for a particular product. The analytic system 100 may identify signals 106 associated with campaign 105 and generate analytics identifying the impact of the campaign within social media sites and measuring the relative success of the campaign.

In one example, the signals associated with campaigns 105 may be determined a priori based on URLs or hash tags within signals 106 associated with campaigns 105. In another example, the message content in signals 106 may include keywords that refer to campaigns 105. The campaign keywords may be uploaded manually to analytic system 100 by an operator or the campaign keywords may be automatically generated by analytic system 100.

Constituents 111 may be based on the number and types of messages sent from the associated social network accounts and the metrics associated with the associated social network accounts. For example, a constituent that sends or posts a large number of positive messages related to a particular company may be identified as an advocate of the company. A constituent that has a relatively large number of followers may be identified as an influencer.

Analytic system 100 may identify different relationships 112 between different signals 106, between different accounts 108, and/or between different signals and different accounts. For example, analytic system 100 may identify different on-line conversations 112 associated with brands 110B or campaigns 105. Signals 106 associated with conversations 112 about brands 110B or campaigns 105 may be assigned associated conversation identifiers.

Analytics system 100 may generate different social analytics 114 for brands 110B and/or campaigns 105 based on the associated conversations 112 and constituents 110D participating in conversations 112. For example, analytic system 100 may generate a quantitative score for one of accounts 108 associated with one of campaigns 105 based on the strength of conversations 112 associated with campaign 105. The strength of conversations 112 may be based on the number of signals 106 and number and types of constituents 110 participating in the conversations 112 related to campaigns 105.

Contextual dimensions 110, constituents 111, and relationships 112 allow analytic system 100 to derive quantitative performance scores for a wider variety of different definable entities. The modeling provided by contextual dimensions 110, constituents 111, and relationships 112 also allow more efficient and accurate social analytics generation by identifying and processing signals 106 most relevant to accounts 108 and particular contextual dimensions 110.

Figure 2:
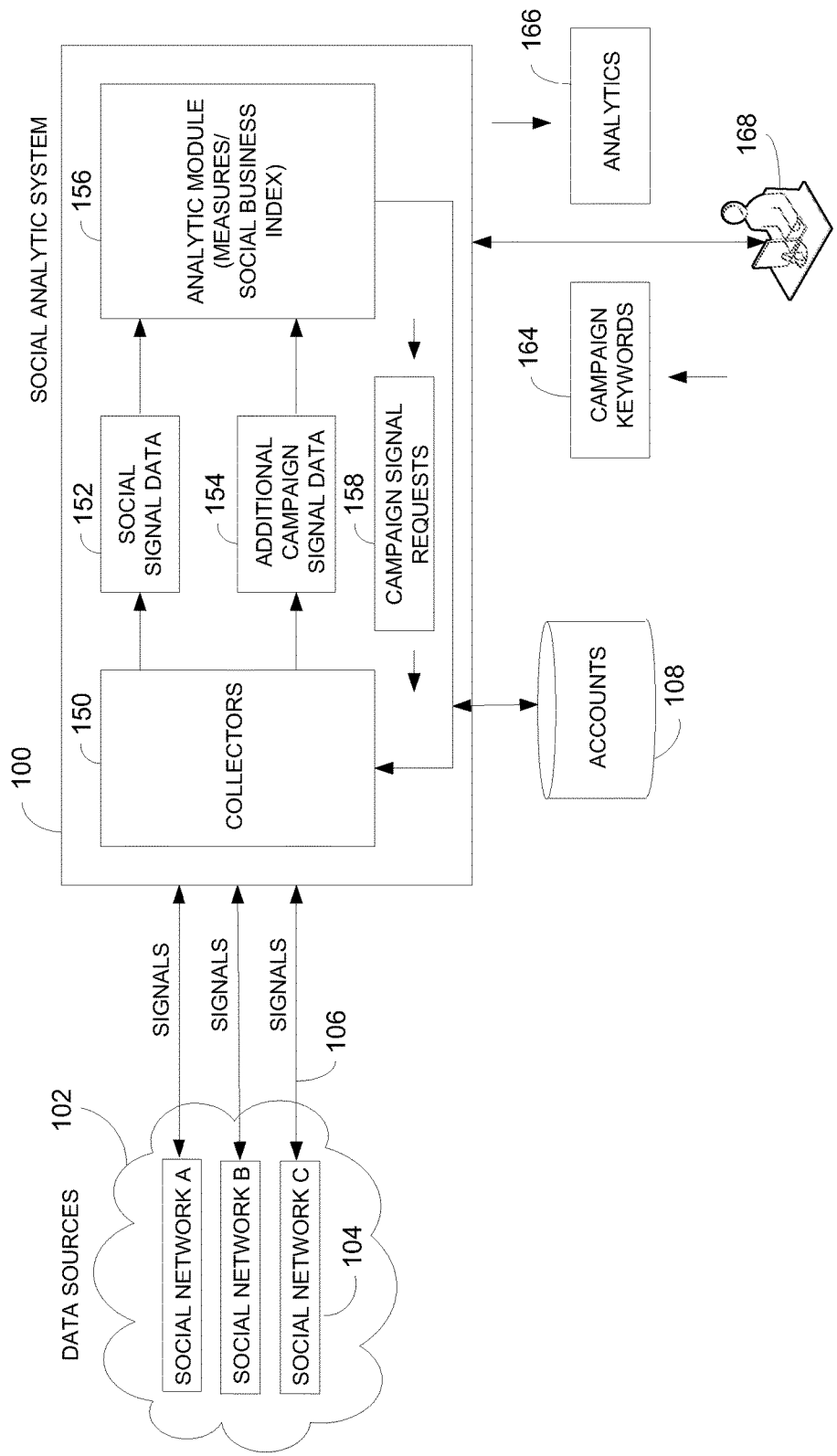
FIG. 2 depicts an example of how the social analytic system generates campaign analytics.

FIG. 2 depicts a more detailed example of analytic system 100. Analytic system 100 may comprise an array of local and/or cloud-based computing and storage devices, such as servers and database systems for accessing and processing data collected from different social networks 104. A computing device 168, such as a personal computer, computer terminal, mobile device, smart phone, electronic notebook, or the like, or any combination thereof may display analytic data. For example, computing device 168 may access and display analytics 166, such as campaign analytics, via a web browser or mobile device application. In other embodiments, some or all of analytics 166 may be generated by computing device 168.

The different computing devices within analytic system 100 may be coupled together via one or more buses or networks. Similarly, analytic system 100 may be coupled to social networks 104 and computing device 168 via one or more buses or networks. The busses or networks may comprise local area networks (LANs), wide area networks (WANs), fiber channel networks, Internet networks, or the like, or any combination thereof.

In one example, analytic system 100 may continuously track social performance for thousands of companies and create one or more accounts 108 for each of the companies. As mentioned above, accounts 108 may be associated with accounts on different social networks 104, such as Twitter® accounts, Facebook® accounts, YouTube® accounts, or any other data source where social signals 106 may be generated. The accounts on social networks 104 may be operated by companies, individuals, or any other entity.

Analytics system 100 may assign contextual dimension identifiers to accounts 108 identifying the companies, brands, services, individuals, or any other entity operating the associated accounts in social networks 104. One of accounts 108 associated with a company may be referred to as a company account. The company account 108 may have an associated social graph consisting of other related accounts 108. The set of all accounts 108 related to the company account may be referred to as an ecosystem of the company account. The ecosystem for the company account may comprise both a static social graph and a dynamic social graph.

The static social graph may comprise the set of all accounts 108 that either follow or are followed by the company account and may comprise a statically defined relationship between the accounts. For example, an account 108 associated with a brand, campaign, or subsidiary of the company account may be identified as having a static relationship with the company account.

The dynamic social graph may be a set of accounts 108 that have interacted with the company account in some way whether or not there is a static relationship. For example, some of accounts 108 may mention in messages the company associated with the company account or may forward messages to or from the company account.

Analytic system 100 includes collectors 150 and an analytics module 156. Collectors 150 collect signals 106 from the different social networks 104 associated with accounts 108. Analytics module 156 may include a measures module and a social business index module configured to generate metrics from social signal data 152 obtained from social signals 106. Collectors 150, the measures module, the social business index module, and other elements of analytic system 100 are described in more detail in co-pending U.S. patent application Ser. No. 13/727,991 which has been incorporated by reference.

Analytics module 156 may use social signal data 152 to generate different analytics 166 quantitatively identifying social business performance, adoption, and any other social activity. For example, analytics 166 may identify quantitative scores for different companies, social relationships between brands and their engaged audiences of various constituents, and provide real-time benchmarking of campaigns run by industries, companies, brands, competitors, or geographic regions.

Campaign Analytics

In one example, analytics system 156 may receive campaign keywords 164 from computing device 168. For example, an employee of the company (customer) conducting an advertising campaign may manually generate a set of words and phrases that are used in campaign advertising. In another example, analytics module 156 may dynamically derive the campaign keywords 164. Campaign keywords and campaign terms refer to any words, phrases, text, acronyms, links, identifiers, images, audio, or the like, or any combination thereof that may be used to identify signals 106 associated with a social media campaign.

A campaign may be any social media event launched by a company, individual, device, entity, etc. For example, a campaign may be associated with an advertising campaign launching a new product or service. In another example, the campaign may be associated with a public relations event, a political event, a charity or community event, or the like.

Analytic module 156 may identify social signal data 152 associated with the campaign and generate campaign analytics 166 based on identified social signal data 152. Campaign analytics 166 may quantitatively identify the success of the campaign. For example, campaign analytics 166 may identify an amount of increased social media activity associated with the campaign, a relative increase in social media activity compared with other campaigns, an amount of lift that the campaign receives from brand constituents, an overall sentiment towards the campaign, or the like or any combination thereof.

Based on derived campaign analytics and/or campaign keywords 165, analytics module 156 may send campaign signal requests 158 to accounts 108 or collectors 150. Accounts database 108 or collectors 150 may use campaign keywords to identify other social signals 106 associated with the campaigns. For example, analytics module 156 may identify terms uniquely associated with a particular campaign for a particular brand.

Accounts database 108 may identify additional signals associated with the campaign terms and/or collectors 150 may identify additional social network accounts 104 and/or social signals 106 associated with the campaign terms. The additional signals 106 may provide additional social signal data 152 that analytics module 156 uses to provide more accurate campaign analytics 166.

Figure 3:
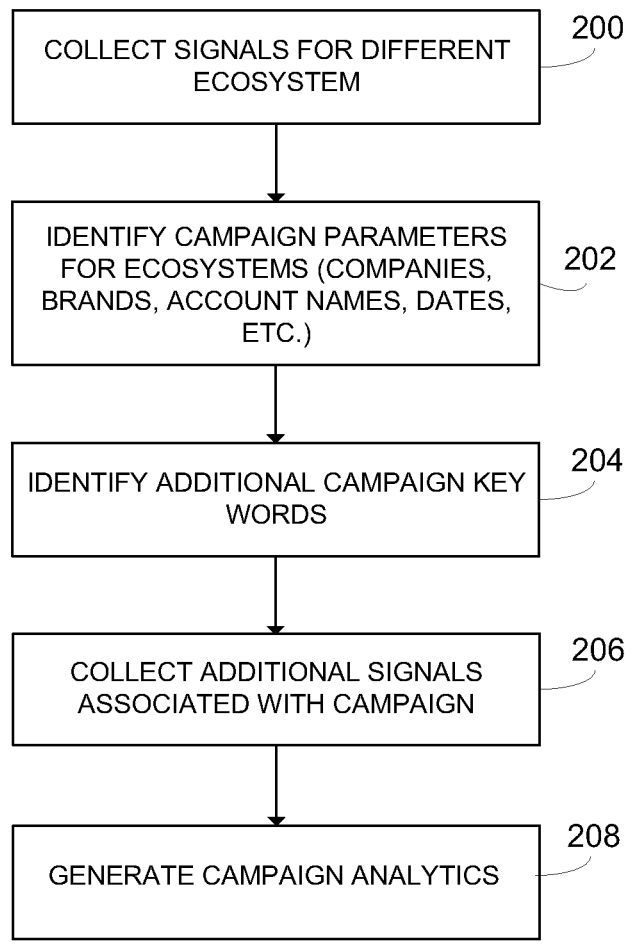
FIG. 3 depicts an example process for generating campaign analytics.

FIG. 3 depicts one example process for generating campaign analytics. In operation 200 the analytics system may collect social signals for different ecosystems and generate different ecosystem metadata. For example, the analytic system may identify the signals associated with a particular ecosystem and identify the relationships of the signals to the ecosystem. For example, the signals may be associated with a company, associated with a constituent of the company, and/or associated with a brand of the company. The relationships identified between signals and some of the analytics generated from the relationships are described in co-pending U.S. patent application Ser. No. 13/727,991 which has been incorporated by reference.

In operation 202, the analytic system may identify parameters associated with a campaign. For example, the analytic system may identify one or more companies, brands, account names, dates etc. that may be associated with a particular campaign. Some of the campaign parameters may be identified a priori by a company employee and other campaign parameters may be dynamically generated by the analytic system. For example, the analytic system may automatically identify social signals associated with a campaign and identify the companies, brands, account names, dates, etc. associated with the identified social signals.

In operation 204, the analytic system may identify campaign keywords. As explained above, the campaign keywords may be received a priori from an employee of a company that wishes to view associated campaign analytics. In a second example, the campaign keywords may be dynamically generated by the analytic system based on analysis of social signal data previously collected in operation 200. For example, the analytic system may dynamically identify terms in the social signal data that may be associated with a particular campaign for a particular brand.

In operation 206, the analytic system may collect additional social signals associated with the campaign. For example, the analytic system may search for previously collected social signals that are associated with any of the campaign parameters identified in operation 202 or that include any of the campaign keywords identified in operation 204. In another example, the analytic system also may collect additional signals from accounts in social networks 104 in FIG. 2 that are associated with the campaign parameters or that include the campaign keywords.

In operation 208, the analytic system may generate campaign analytics associated with campaign signal data. For example, the campaign analytics may identify a campaign, identify an amount of social signal activity associated with the campaign, identify a sentiment for the campaign, rate a success of the campaign, and/or generate any other analytics from the social signal data associated with the campaign.

Figure 4:
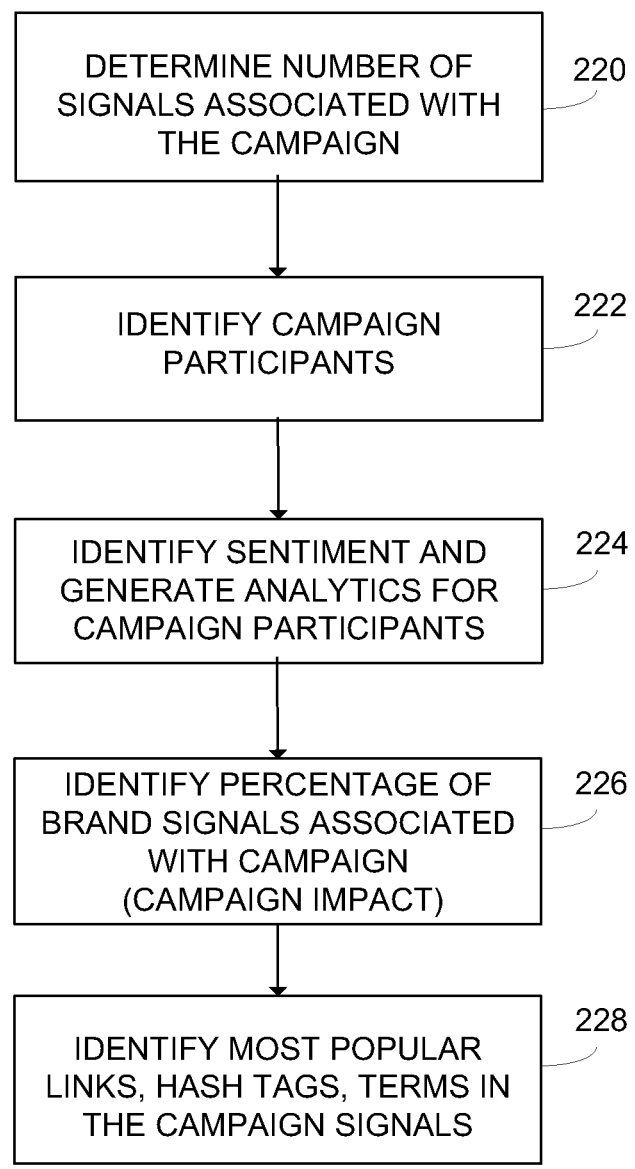
FIG. 4 depicts an example process for determining the social media impact of a campaign.

FIG. 4 depicts an example process for generating campaign analytics. In operation 220, the analytic system may determine the total number of social signals associated with the campaign. For example, the analytic system may count the total number of signals that include campaign keywords or that are associated with the campaign parameters.

In operation 222, the analytic system may identify different campaign participants. For example, the analytic system may identify constituents, such as company, advocates, detractors, employees, market, influencers, etc., that generated the campaign signals.

The analytic system may identify other groups of campaign participants. For example, the analytic system may associate the source of campaign signals with certain demographics such as, age, geographic region, income, sex, etc. The analytic system also may associate the source of the campaign signals with other social groups. For example, the analytic system may identify campaign signals generated by groups referred to as hipsters or techies.

In operation 224, the analytic system may identify the sentiment and generate analytics for the different campaign participants. For example, the analytic system may determine advocates have a generally negative sentiment about the campaign and influencers have an overall positive sentiment about the campaign.

The analytic system may generate other campaign analytics associated with the participants. For example, the analytic system may calculate percentages of different campaign participants by counting a first number of campaign signals associated with a particular one of the participant groups and dividing the first number by a second total number of campaign signals.

In operation 226, the analytic system may identify a campaign impact by determining a percentage of brand signals attributable to the campaign. For example, the analytic system first may identify a total number of signals having parameters or containing keywords associated with a particular car brand.

The analytic system then may identify the percentage of those brand signals associated with a new advertising campaign. For example, the analytic system may count the number of brand signals that include parameters, keywords, links, etc. associated with the campaign.

The ratio between the number of campaign signals associated with the brand and the total number of signals associated with the brand may identify an impact of the advertising campaign on the brand. In other words, a large increase in the overall number of brand signals attributed to the campaign may indicate a successful campaign that created a large social media impact or buzz for the brand. On the other hand, a small increase in the number of brand signals attributed to the campaign may indicate an unsuccessful campaign that created a small social media impact or buzz for the brand.

Operation 228 may identify additional links, hash tags, terms etc. used in the campaign signals. For example, the analytic system may receive a list of campaign terms from a customer. Campaign signals may be identified based on the customer list. The identified campaign signals may identify or contain additional data, such as accounts, terms, links, hash-tags, etc. not contained in the original customer list. The analytic system may the additional data to locate additional social signals and accounts associated with the campaign. The analytic system may update campaign analytics based on the additional signal data.

Figure 5:
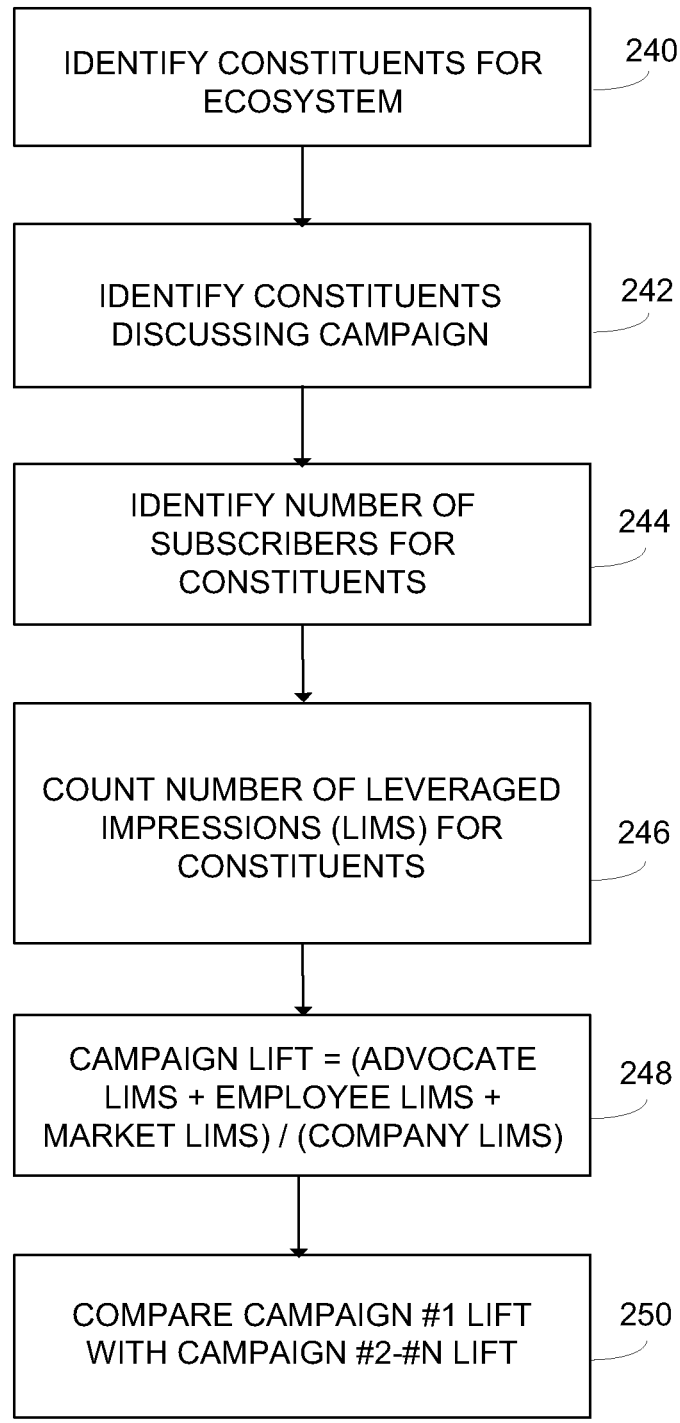
FIG. 5 depicts an example process for determining a constituent lift provided by a campaign.

FIG. 5 depicts an example process for identifying leveraged impressions and lift associated with a campaign. In operation 240, the analytic system may identify constituents for a particular ecosystem. For example, the analytic system may identify all of the company, advocate, influencer, detractor, and market accounts for a car company.

In operation 242, the analytic system may identify the accounts that discussed a campaign for a particular car brand of the car company. For example, the analytic system may identify signals generated by advocates over a two week time period that include campaign terms.

In operation 244, the analytic system may identify the number of subscribers for each of the identified advocate accounts. For example, the analytic system may identify the number of followers on the advocates Twitter® accounts.

In operation 246, the analytic system may identify a number of leveraged impressions (LIMS) for each of the constituent accounts. For example, the analytic system may identify each advocate that generates, forwards, or mentions social signals associated with the campaign. The analytic system identifies the total number of subscribers for all of the identified advocates as the advocate LIM.

Operation 248 may derive a campaign lift from the constituent LIMs. For example, the analytic system may sum the campaign LIMS for advocates, employees, influencers, and/or market constituents. The sum may be divided by the LIMs associated with the company. This ratio may indicate additional social media exposure or "lift" provided by constituents beyond the social media activity provided by the company.

Operation 250 may compare the lift for different campaigns. For example, a first lift may be calculated for a first marketing campaign for a car brand. The first lift may be compared with a second lift calculated for a second marketing campaign for the same car brand. The comparison may indicate the relative success of the first and second campaigns. In another example, the lift for a first campaign for a first car brand may be compared with the lift for other campaigns for other car brands sold by other competitor car companies. The comparison may indicate a relative success of the first campaign within a particular industry.

Brand Vocabulary

Figure 6:
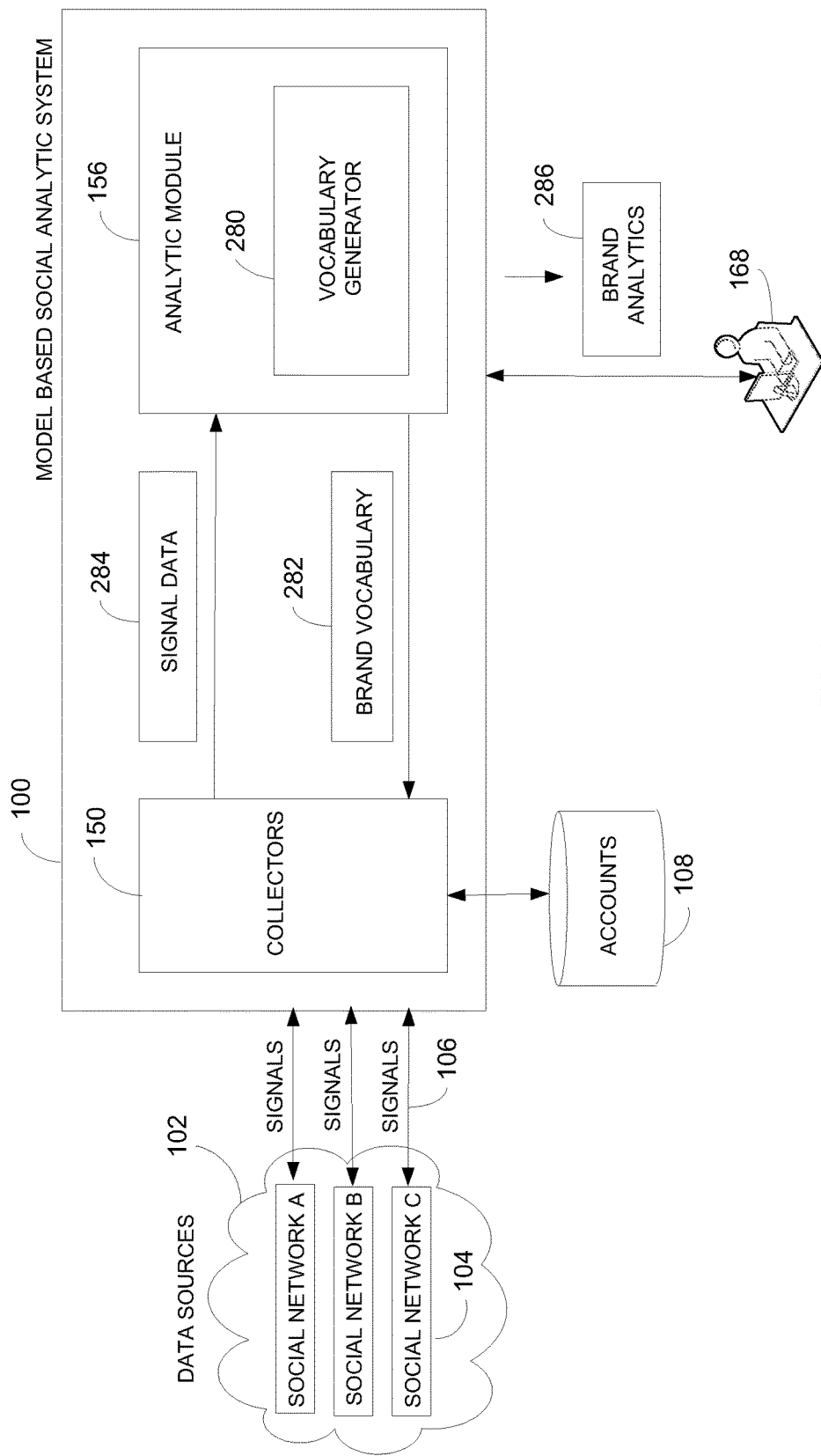
FIG. 6 depicts an example of a social analytic system that generates brand vocabularies.

FIG. 6 depicts an example of a vocabulary generator 280 used in the social analytic system 100. Vocabulary generator 280 is described below as generating a brand vocabulary, but may generate vocabularies for any category of social signals, such as for a campaign, a company, a constituent, a product, a service, an entity, an issue, etc.

As mentioned above, analytic system 100 may receive terms a priori associated with a particular brand or a particular campaign. For example, the customer operating computing device 168 may manually upload a set of keywords associated with a particular brand or a particular campaign. Analytic module 156 may use the keywords to identify signals associated with the brand or brand campaign and generate associated analytics.

The customer may not know all of the keywords used by constituents when discussing a particular brand or campaign. Terms used for describing brands also may change over time or may change in response to different campaigns. For example, a campaign for a car brand may refer to a Bluetooth® feature. The customer may not have the resources to constantly track of all of the new terms used by constituents or used in campaigns for describing every company brand.

Vocabulary generator 180 may dynamically identify the terms currently associated with brands, campaigns, or any other social media activity. For example, vocabulary generator 180 may automatically and dynamically identify Bluetooth® as a new term used by constituents when discussing the car brand.

Vocabulary generator 280 may generate brand vocabulary 282 from the social signals 106 associated with the brand or campaign. Analytic system 100 may use brand vocabulary 282 to identify other signal data 284 in accounts 108 or in social networks 104 associated with the brand or campaign. Analytic module 156 may use signal data 284 to generate brand or campaign analytics 286.

Figure 7:
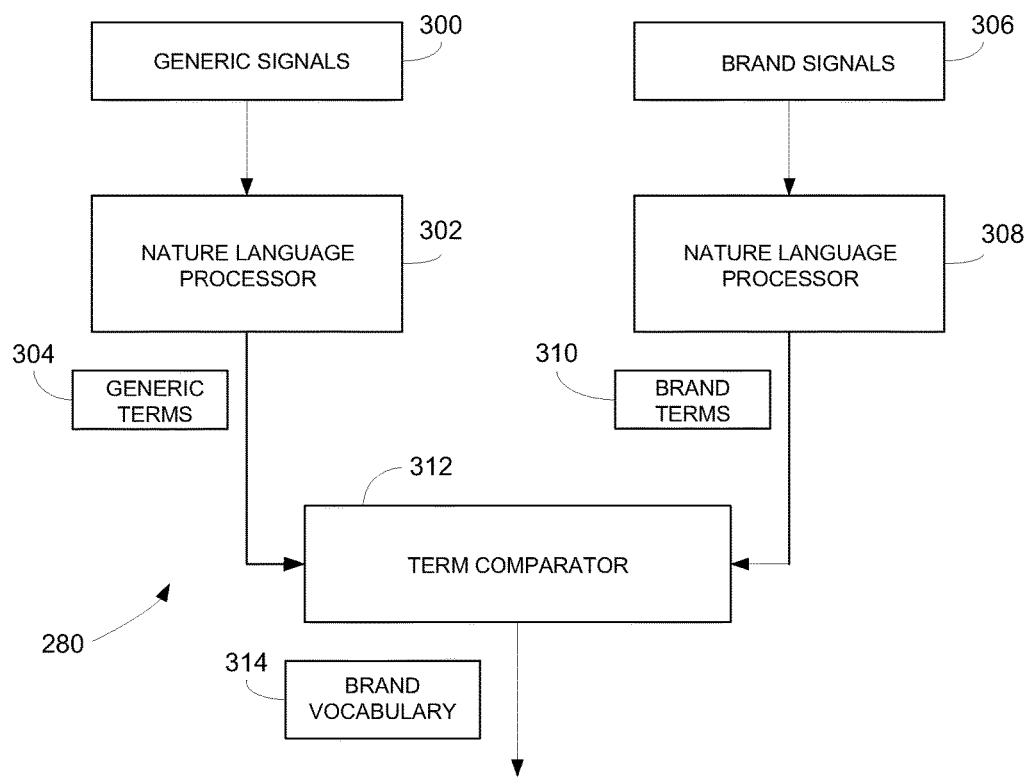
FIG. 7 depicts an example of how social signal terms are used for generating a brand vocabulary.

FIG. 7 depicts one example of how the vocabulary generator may generate a brand vocabulary. Generic signals 300 may comprise all of the signals associated with a particular ecosystem. In another example, generic signals 300 may comprise all of the signals associated with a particular brand, subject, product, service, etc. For example, generic signals 300 may comprise all of the social signals associated with basketball shoes manufactured by a particular company or all of the social signals associated with basketball shoes manufactured by all companies.

Brand signals 306 may comprise all of the signals associated with a particular brand. For example, the analytic system may collect all of the signals associated with a particular basketball shoe account operated by a particular shoe company. The analytic system also may collect signals from constituents of the basketball shoe account and collect any other social signals that mention the basketball shoe brand or contain links or hash tags referencing the basketball shoe brand.

A natural language processor 302 may identify generic terms 304 in generic signals 300. A natural language processor 308 may generate brand terms 310 in brand signals 306. For example, natural language processor 302 may identify sentence structures for text within generic signals 300, identify nouns within the sentences, identify frequently used words within the signal text, identify distances between the most frequently used words to identify common phrases within the text, etc.

Natural language processors 302 and 308 also may use clustering algorithms or any other processing techniques to identify terms 304 and 310 identifying the context of generic signals 300 and brand signal 306. Natural language processors are known and therefore not described in further detail. Other techniques for identifying the context of a group of signals is described in co-pending U.S. patent application Ser. No. 13/727,991 which has been incorporated by reference.

A term comparator 312 may compare generic terms 304 with brand terms 310. Any brand terms 310 that match generic terms 304 may be filtered. For example, terms that exist both in generic terms 304 and brand terms 310 may generically refer to basketball shoes but may not have a strong association with the basketball shoe brand associated with brand signals 306. Accordingly, the generic basketball shoe terms 304 are removed from brand terms 310. The remaining filtered brand terms 310 are referred to as a brand vocabulary 314 and may represent a unique vocabulary used by constituents to discuss a particular basketball shoe brand.

Brand vocabulary 314 may include terms that were not previously known by the company that sells the brand. For example, the customer operating computing device 168 in FIG. 6 may not be aware of particular phrases or sports figure associated with the basketball shoe brand.

As mentioned above, vocabulary generator 280 may identify any variety of social media vocabularies used for discussing companies, industries, products, brands, campaigns, events, issues, etc. For example, signals 300 may be associated with a particular company brand and signals 306 may be associated an advertising campaign for the brand. Term comparator 312 may compare brand terms 304 with campaign terms 310 to identify the unique terms associated with the campaign.

Figure 8:
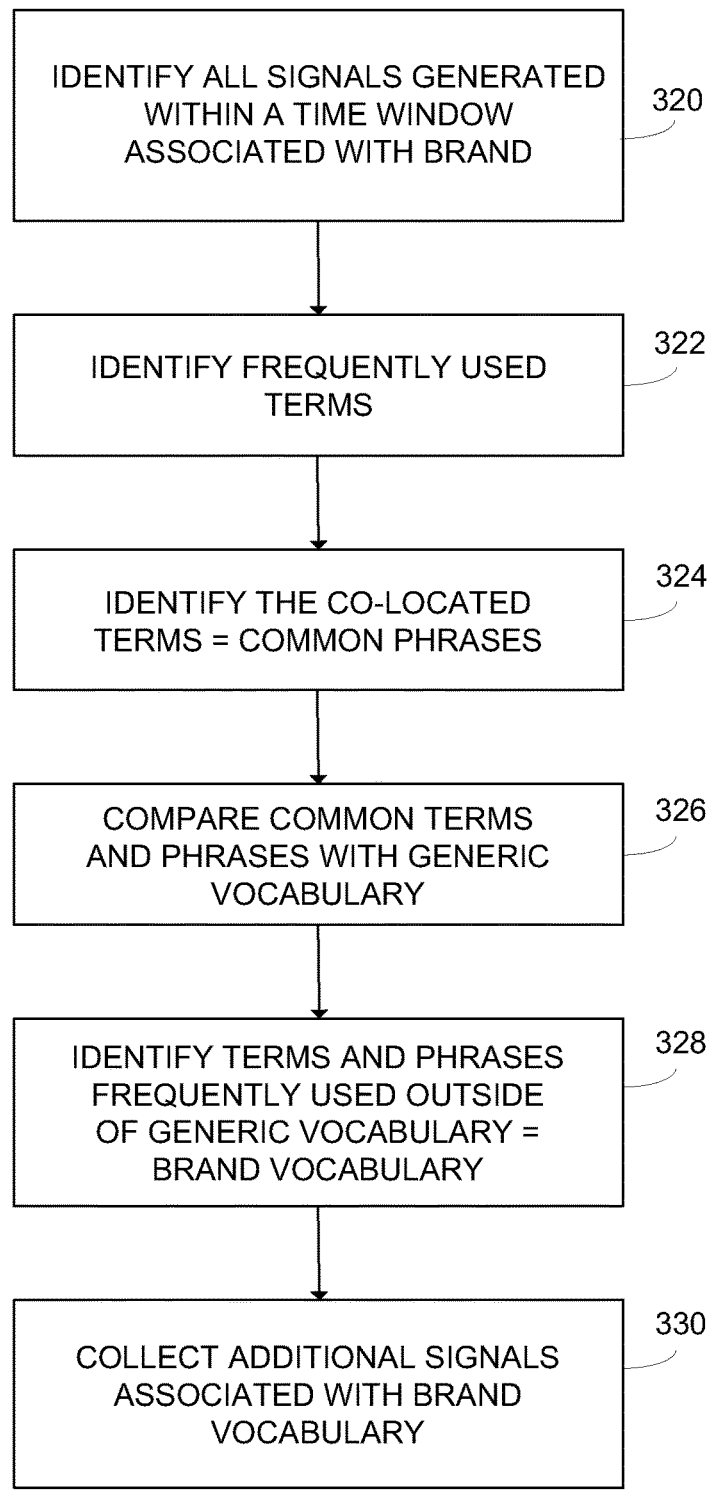
FIG. 8 depicts an example process for generating a brand vocabulary.

FIG. 8 depicts an example process for generating a brand or campaign vocabulary. Operation 320 identifies all of the social signals associated with a particular brand. The signals may be generated by the company selling the brand and brand constituents, such as company employees, advocates, market, etc. In one example, the signals are collected for a particular time period, such as for the last month, last day, etc. Periodically, updating the brand signals allows the vocabulary generator to dynamically update the brand vocabulary currently being used by brand constituents.

In operation 322, the vocabulary generator may identify frequently used terms in the brand signals. As mentioned above, the vocabulary generator may count the number of times particular words are used in the brand signals and identify the most frequently used words. Operation 324 may identify co-located terms. For example, words frequently used within a same sentence or within a particular number of words of each other may be identified as common phrases.

Operation 326 compares the identified brand terms and phrases with a generic vocabulary, such as a generic vocabulary for the company or a generic vocabulary for a type of product. For example, if the brand is associated with a car model, the generic vocabulary may be generated from all social signals associated with the car manufacturer or from all social signals associated with a car category, such as hybrids.

Operation 328 identifies the terms and phrases used outside of the generic vocabulary as the brand vocabulary. As mentioned above, the brand vocabulary may identify the terms and phrases that are uniquely associated with the brand. For example, constituents may use a phrase such as "Eco-Series" to identify a particular car brand. The term Eco-Series may not be one of the most frequently used terms in the generic vocabulary but may be one of the most frequently used terms for the car brand. Accordingly, the vocabulary generator may added the term Eco-Series to the brand vocabulary Operation 330 may use the brand vocabulary to identify other social signals associated with the brand. For example, collectors may search for additional social signals from internal ecosystem accounts or external social network accounts associated with the phrase Eco-Series. The analytic system may use the additional signals to generate brand analytics.

Figure 9:
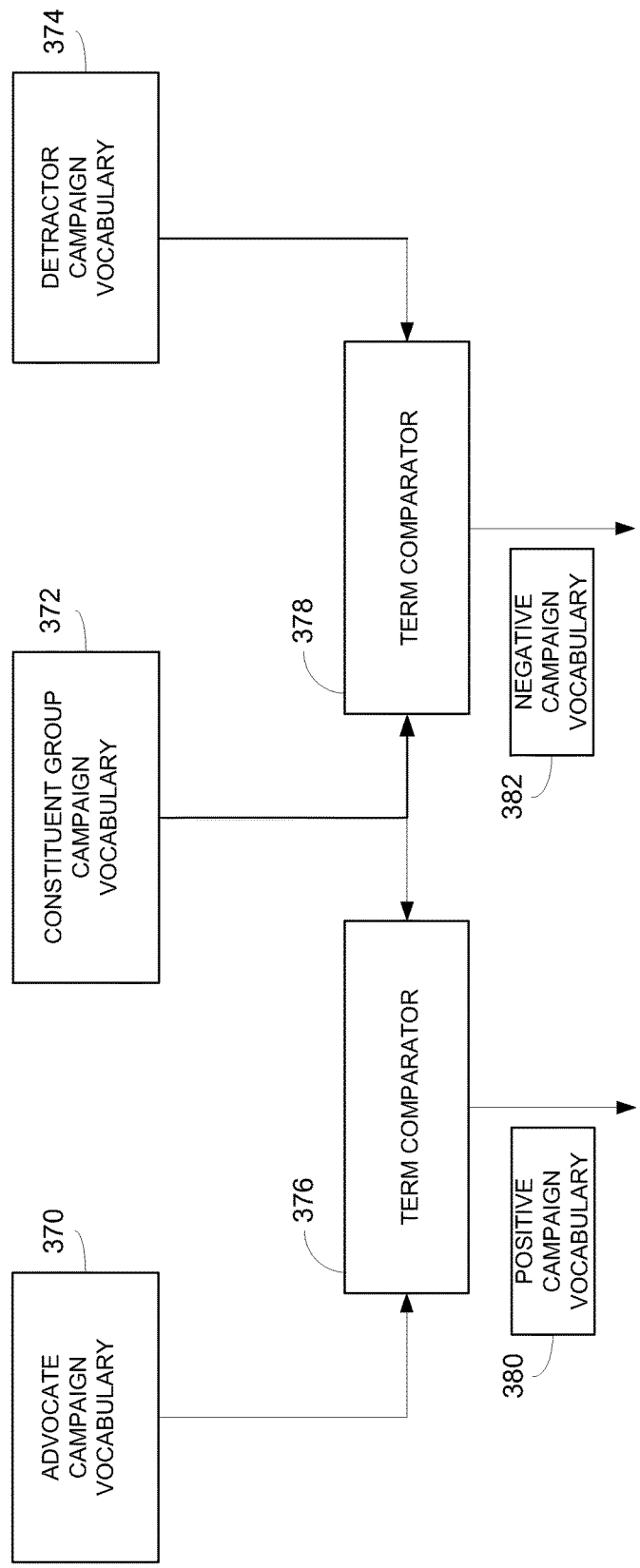
FIG. 9 depicts an example of how a social analytic system identifies a positive and a negative campaign vocabulary.

FIG. 9 depicts one example of how the analytic system may identify positive and negative vocabularies. The analytic system may generate an advocate campaign vocabulary 370, an overall constituent group campaign vocabulary 372, and a detractor campaign vocabulary 374. A constituent group may comprise all of the constituents associated with a particular ecosystem and constituent group campaign vocabulary 372 may be generated as described above from the constituent group social signals associated with a particular brand campaign.

Advocate campaign vocabulary 370 may comprise the terms most frequently used by advocates when referring to the campaign. For example, the vocabulary generator may identify all of the signals generated by advocates that are associated with the campaign. The vocabulary generator then may compare the most frequently used advocate terms with the most frequently used terms for all constituents. The unique advocate terms may be identified as advocate campaign vocabulary 370.

The vocabulary generator also may identify all of the signals generated by detractors that are associated with the campaign. The vocabulary generator then may compare the most frequently used detractor terms with the most frequently used terms for all constituents. The unique detractor terms may be identified as detractor campaign vocabulary 374.

A term comparator 376 may identify the terms in advocate campaign vocabulary 370 that are not also part of constituent group campaign vocabulary 372 as positive campaign vocabulary 380. Positive campaign vocabulary 380 may identify campaign terms and phrases that are positively received by the constituents.

A term comparator 378 may identify the terms in detractor campaign vocabulary 374 that are not also part of constituent group campaign vocabulary 372 as negative campaign vocabulary 382. Negative campaign vocabulary 382 may identify campaign terms and phrases that are negatively received by the constituents.

Positive campaign vocabulary 380 may be used to increase the success of campaigns. For example, positive campaign vocabulary 380 may include the phrase Bluetooth® and may identify a brand of stereo system used in cars. The company may emphasize Bluetooth® and the identified brand of stereo system in future car campaigns.

Negative campaign vocabulary 382 also may be used to increase the success of campaigns. For example, negative campaign vocabulary 382 may include the phrase fuel economy. The company may avoid discussing or deemphasize vehicle fuel economy in future car campaigns.

Figure 10:
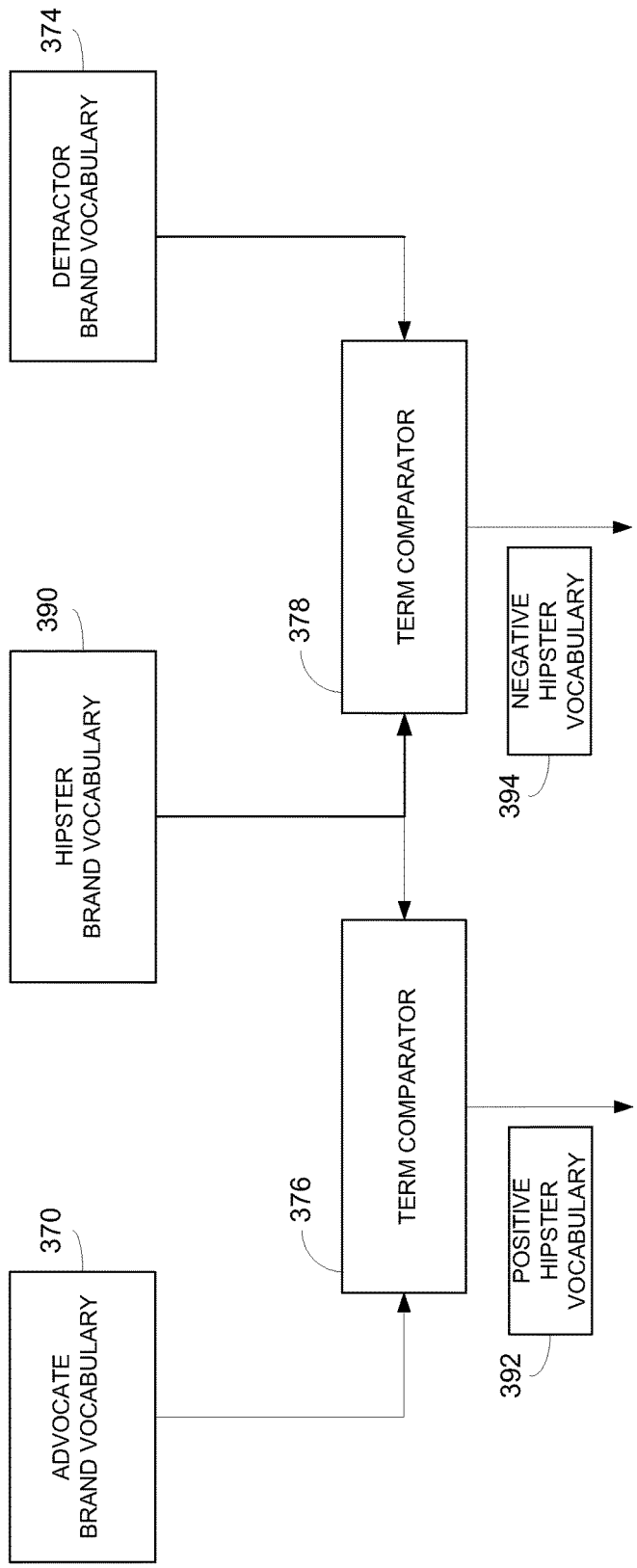
FIG. 10 depicts an example of how the social analytic system identifies a positive and negative campaign vocabulary for a particular social group.

FIG. 10 depicts an example of how brand vocabularies may be used for customizing campaigns for different demographic or social groups. In this example, the social group is referred to as hipsters and may be associated with persons within a particular age range, that may purchase particular types of products or services, have particular interests, and live within particular geographic or urban regions, etc.

The vocabulary generator may generate a hipster brand vocabulary 390. For example, the analytic system may identify social media accounts where users classify themselves in user profiles as hipsters. The analytic system also may identify followers of particular products, services, music, issues, or accounts associated with any of hipster social group. The analytic system also may receive terms a priori from the company associated with hipsters.

The analytic system then may identify the social signals associated with the hipster parameters that are also associated with a particular brand. The vocabulary generator may compare the most frequently used terms in the hipster brand related signals and with the most frequently used terms for all brand related signals (generic brand signals). The vocabulary generator may identify the most frequently used terms in the hipster signals that are not also contained in the generic brand related signals as hipster brand vocabulary 390.

As described above the vocabulary generator also may generate an advocate brand vocabulary 370 comprising the most frequently used terms for brand advocates and a detractor brand vocabulary 374 comprising the most frequently used terms for brand detractors.

Term comparator 376 may generate a positive hipster vocabulary 392 identifying the common terms in advocate brand vocabulary 370 and hipster brand vocabulary 390. Positive hipster vocabulary 392 may identify terms and items appealing to the hipster social group. For example, the phrase "checkered tennis shoes" may appear in positive hipster vocabulary 392.

Term comparator 378 may identify common terms in detractor campaign vocabulary 374 and hipster brand vocabulary 390 as a negative hipster vocabulary 394. Negative hipster vocabulary 394 may identify terms and phrases that are viewed negatively by hipsters.

Positive hipster vocabulary 392 and negative hipster vocabulary 384 may be used to increase the success of brand campaigns directed to hipsters. For example, the company may emphasize terms or items identified in positive hipster vocabulary 392 in hipster advertising campaigns. Conversely, the company may avoid using the terms or items identified in negative hipster vocabulary 394 in the hipster advertising campaigns.

Thus, the analytic system can use vocabularies generated by the vocabulary generator to identify more relevant social signals for brands, campaigns, etc. and can use the social signals to generate more accurate social media analytics. The analytic system also can use the vocabularies to automatically identify different words, terms, phrases, etc. that may improve the success of social media campaigns.

Figure 11:
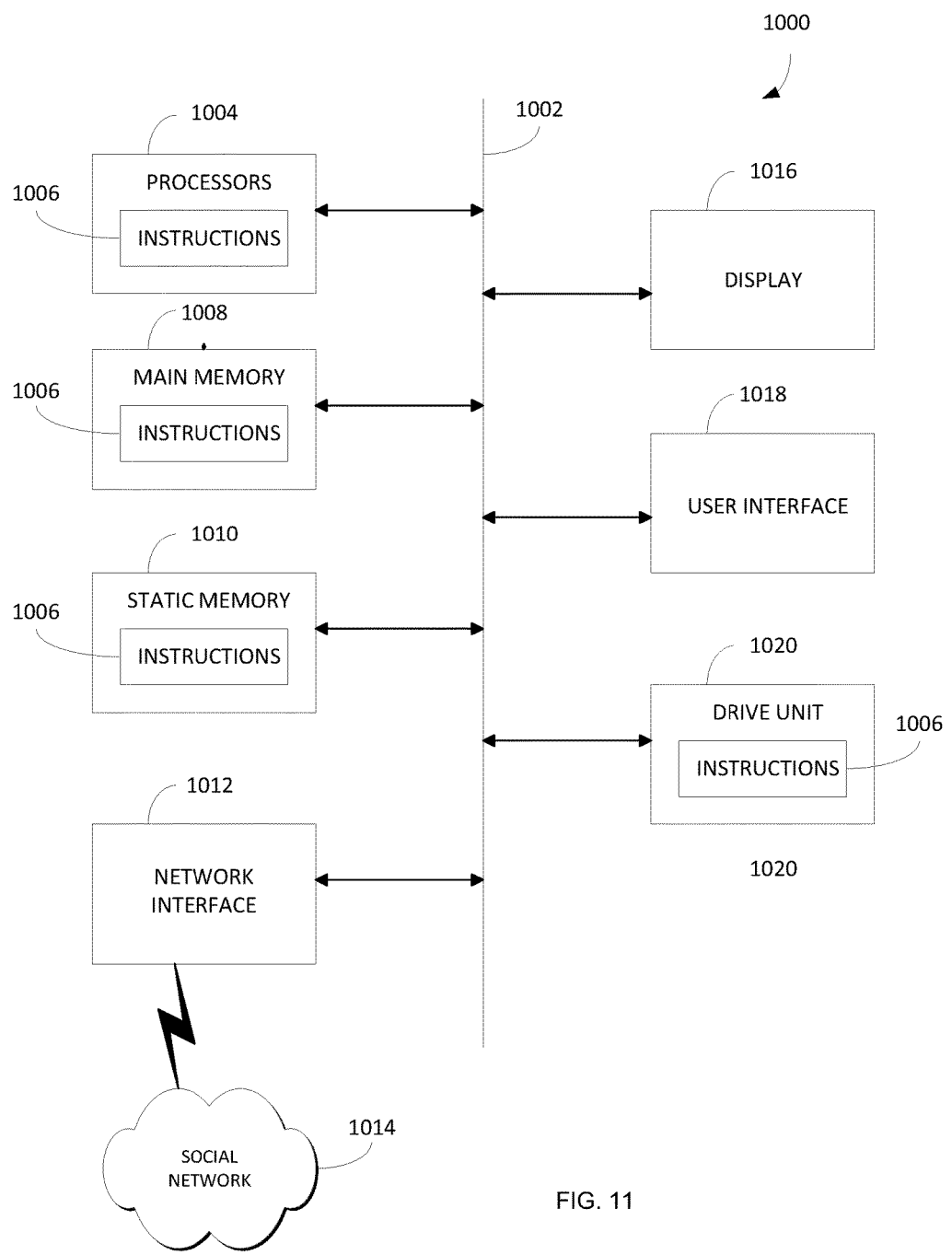
FIG. 11 depicts an example of a computing device used for implementing the social analytic system.

FIG. 11 shows a computing device 1000 that may be used for operating the social analytic system and performing any combination of the social analytics discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method, comprising:
   identifying, by a computing device, a set of social signals generated on an electronic social network;
   identifying, by the computing device and at a first time, a first subset of said set of social signals generated on the electronic social network;
   wherein the social signals of the first subset are associated with a campaign defined by electronically stored campaign data, wherein the campaign data is associated with known campaign terminology;
   inputting the social signals of the first subset into a natural language processor to discover new campaign terminology that is different than the known campaign terminology, the new campaign terminology not a priori associated with the campaign by the campaign data, wherein the new campaign terminology is discovered at a second time that is later than the first time;
   identifying a first keyword based on the new campaign terminology;
   identifying a second additional subset of said set of social signals using the first keyword, wherein the second additional subset is different than the first subset, wherein the identifying the second additional subset is by the computing device; and
   generating, by the computing device, analytics for the campaign from the social signals of the second additional subset.

2. The method of claim 1, wherein identifying, by the computing device and at the first time, the first subset of the social signals comprises:
   receiving second keywords, wherein the received second keywords are a priori associated with the campaign data, and wherein said first keyword is not a priori associated with the campaign at a time of the receipt of the second keywords; and
   identifying the first subset using the received second keywords.

3. The method of claim 1, further comprising:
   identifying a first number of ones of the social signals of said set that are associated with a brand;
   identifying a second number of ones of social signals of said set that are associated with the campaign, wherein the campaign is associated with the brand; and
   identifying a social media impact of the campaign based on the first number of the social signals that are associated with the brand and the second number of the social signals that are associated with the campaign.

4. The method of claim 1, further comprising:
   identifying constituents associated with the campaign;
   identifying a number of subscribers for the constituents; and
   determining leveraged impressions for the constituents based on the number of subscribers for the constituents.

5. The method of claim 4, further comprising:
   identifying a leveraged impression for a company based on a number of subscribers for accounts operated by the company; and
   identifying a campaign lift based on a ratio between the leveraged impressions for the constituents and the leveraged impression for the company.

6. The method of claim 5, further comprising;
   comparing the campaign lift with other campaign lifts for other campaigns to identify a relative success of the campaign.

7. The method of claim 1, further comprising identifying a campaign vocabulary for the campaign based on the known campaign terminology and the new campaign terminology.

8. The method of claim 7, wherein identifying the campaign vocabulary based on the known campaign terminology and the new campaign terminology comprises:
   identifying a first group of the social signals of said collected set, the social signals of the first group associated with a brand for the campaign;
   identifying a second group of the social signals of said collected set, the social signals of the second group associated with the campaign;
   identifying a first set of frequently used terms in the social signals of the first group;
   identifying a second set of frequently used terms in the social signals of the second group; and
   identifying at least some of the second set of frequently used terms that are in the first set of frequently used terms as the campaign vocabulary.

9. The method of claim 8, further comprising:
   identifying an advocate campaign vocabulary for advocates of the brand; and
   identifying at least some of the advocate campaign vocabulary that is not contained in the campaign vocabulary as a positive campaign vocabulary.

10. The method of claim 9, further comprising:
    identifying a detractor campaign vocabulary for detractors of the brand; and
    identifying at least some of the detractor campaign vocabulary that is not contained in the campaign vocabulary as a negative campaign vocabulary.

11. The method of claim 1, further comprising:
    identifying a first vocabulary from ones of the social signals of the second additional subset that are associated with a social group;
    identifying a second vocabulary from ones of the social signals of the second additional subset that are associated with advocates of the brand; and
    identifying at least some of the first vocabulary that is also contained in the second vocabulary as a positive brand vocabulary for the social group.

12. The method of claim 1, wherein the second additional subset of social signals is a superset with respect to the first subset of social signals.

13. The method of claim 1, wherein inputting the social signals of the first subset into the natural language processor to discover the new campaign terminology that is different than the known campaign terminology further comprises:
identifying a first group of the social signals of the first subset and a second different group of the social signals of the first subset;
inputting the social signals of the first group and the second group into the natural language processor to obtain first terms and second terms, respectively;
responsive to obtaining the first terms and the second terms from the natural language processor, filtering the first terms using the second terms; and
identifying said first keyword responsive to the filtering.

14. An apparatus, comprising:
circuitry configured to store a collected set of social signals generated on an electronic social network, the circuitry further configured to:
identify, at a first time, the social signals associated with a brand from the collected set of social signals generated on the electronic social network;
input the social signals associated with the brand into a natural language processor to discover new brand terminology that is different than known brand terminology for the brand, the new brand terminology not a priori associated with the brand by electronically stored data corresponding to the brand, wherein the new brand terminology is discovered at a second time that is later than the first time;
generate a brand vocabulary based on the known brand terminology and the new brand terminology;
identify a keyword based on the brand vocabulary;
identify, using the keyword, additional social signals associated with the brand vocabulary from the collected set of social signals generated on the electronic social network; and
generate analytics for the brand based on the identified social signals and the additional social signals associated with the brand.

15. The apparatus of claim 14, wherein the circuitry is further configured to:
identify a first group of ones of the social signals of said collected set that are associated with an ecosystem;
identify a first set of most frequently terms in the first group of social signals;
identify a second group of the social signals associated with the brand;
identify a second set of most frequently terms in the second group of social signals; and
generate the brand vocabulary based on the first set of most frequently used terms and the second set of most frequently used terms.

16. The apparatus of claim 15, wherein the circuitry is further configured to:
compare the first set of most frequently used terms with the second set of most frequently used terms; and
identify at least some of the second set of most frequently terms that are contained in the first set of most frequently used terms as the brand vocabulary.

17. The apparatus of claim 14, wherein the circuitry is further configured to:
identify a first group of the social signals associated with the brand;
identify a first set of most frequently terms in the first group of social signals;
identify a second group of ones of the social signals associated with a campaign conducted for the brand;
identify a second set of most frequently terms in the second group of social signals; and
generate a campaign vocabulary based on the first set of most frequently used terms and the second set of most frequently used terms.

18. The apparatus of claim 14, wherein the circuitry is further configured to:
identify a first group of ones of the social signals of the collected set that are associated with a user group;
identify a first set of most frequently terms in the first group of social signals;
identify a second group of ones of the social signals that are associated with an advocate of the brand;
identify a second set of most frequently terms in the second group of social signals; and
generate a positive brand vocabulary for the user group based on the first set of most frequently used terms and the second set of most frequently used terms.

19. The apparatus of claim 18, wherein the circuitry is further configured to:
identify a third group of ones of the social signals that are associated with detractor of the brand;
identify a third set of most frequently terms in the third group of social signals; and
identify a negative brand vocabulary for the user group based on the first set of most frequently used terms and the third set of most frequently used terms.

20. The apparatus of claim 14, wherein the circuitry is further configured to:
identify a first set of ones of the social signals associated with the brand that are generated during a first time period;
identify a second set of ones of the social signals associated with the brand that are generated during a second time period;
identify a first set of the terms used in the first set of the social signals;
identify a second set of the terms used in the second set of the social signals; and
detect a campaign associated with the brand based on the first set of the terms and the second set of the terms.

21. The apparatus of claim 20, wherein the circuitry is further configured to generate a campaign vocabulary for the campaign based on the first set of the terms and the second set of the terms.

22. A system, comprising:
a processing device configured to:
collect a set of social signals from different electronic social networks;
identify a first set of said collected set of social signals associated with a brand;
identify a second set of ones of said collected set of social signals that are associated with a campaign for the brand, the campaign defined by electronically stored campaign data, wherein the campaign data is associated with known campaign terminology and said identification of the second set of the social signals includes:
receive first keywords that are a priori associated with the campaign;
identify, at a first time, a grouping of the social signals of the collected set using the first keywords;
input the social signals of the grouping into a natural language processor to discover new campaign terminology that is different than the known campaign terminology, the new campaign terminology not a priori associated with the campaign by the campaign data, wherein the new campaign terminology is discovered at a second time that is later than the first time;

identify a second keyword based on the new campaign terminology; and identify at least one of the social signals of said collected set that is not part of the grouping using the second keyword, wherein the second set of the social signals includes the social signals of the grouping and the at least one of the social signals of said collected set that is not part of the grouping; and identify a first set of terms used in the first set of social signals;

identify a second set of terms used in the second set of social signals; and generate a campaign vocabulary based on a comparison of the first set of terms with the second set of terms.

23. The apparatus of claim 22, wherein the processing device is further configured to:

identify a first set of most frequently used terms in the first set of terms;

identify a second set of most frequently used terms in the second set of terms; and identify at least some of the second set of most frequently used terms that are not contained in the first set of most frequently used terms as part of the campaign vocabulary.

24. The apparatus of claim 23, wherein the processing device is further configured to:

identify a third set of ones of the social signals of the collected set that are associated with an advocate of the brand;

identify a third set of terms used in the third set of social signals;

generate a positive campaign vocabulary based on a comparison of the third set of terms with the campaign vocabulary.

* * * * *